United States Patent [19]

Hu et al.

[11] Patent Number: 5,021,985

[45] Date of Patent: Jun. 4, 1991

[54] VARIABLE LATENCY METHOD AND APPARATUS FOR FLOATING-POINT COPROCESSOR

[75] Inventors: Larry Hu, Mountain View; Ting Chuk, San Jose; John McLeod, Sunnyvale; Mark Birman, Santa Clara; Allen Samuels, Milpitas; George K. Chu, Cupertino, all of Calif.

[73] Assignee: Weitek Corporation, Sunnyvale, Calif.

[21] Appl. No.: 467,879

[22] Filed: Jan. 19, 1990

[51] Int. Cl.⁵ .............................................. G06F 7/38
[52] U.S. Cl. ................................... 364/748; 364/200; 364/736
[58] Field of Search ........ 364/748, 736, 200 MS File, 364/754

[56] References Cited

U.S. PATENT DOCUMENTS 4,612,628  9/1986  Beauchamp et al. ............... 364/748
4,901,267  2/1990  Birman et al. ...................... 364/748

Primary Examiner—Gary V. Harkcom
Assistant Examiner—Long T. Nguyen
Attorney, Agent, or Firm—Townsend and Townsend

[57] ABSTRACT

A programmable latency (a programmable number of clock cycles) needed for an operation completion. The required latency for a pipe is determined from a formula including the system clock cycle time which the unit will be specified to operate under. The latency is preprogrammed by setting the count of a timer accordingly to provide at least the minimum number of clock cycles necessary to cover the time required to do the computation. Separate timers are independently set for arithmetic logic unit (ALU) operations, multiply operations, logical operations and divide and square root operations.

12 Claims, 8 Drawing Sheets

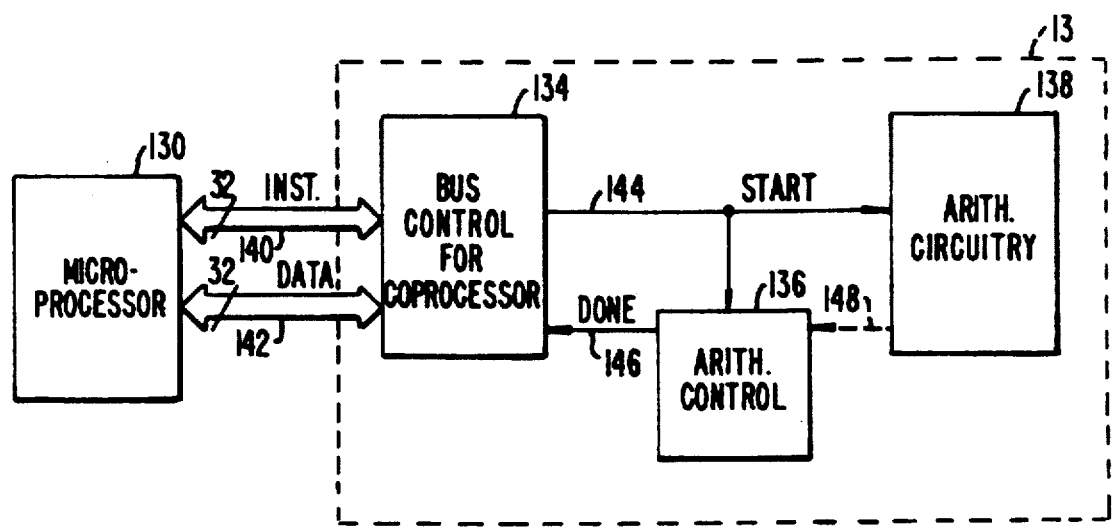
FIG._1.
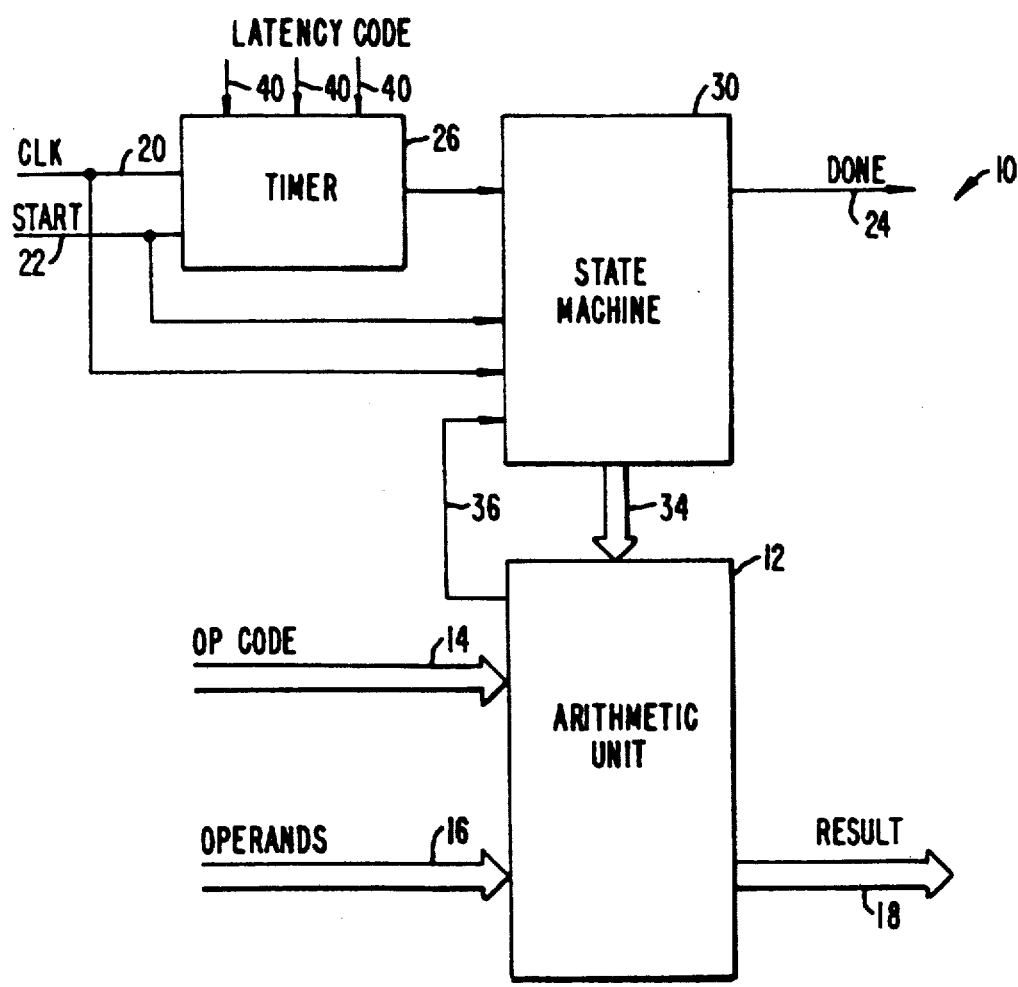
FIG._2.

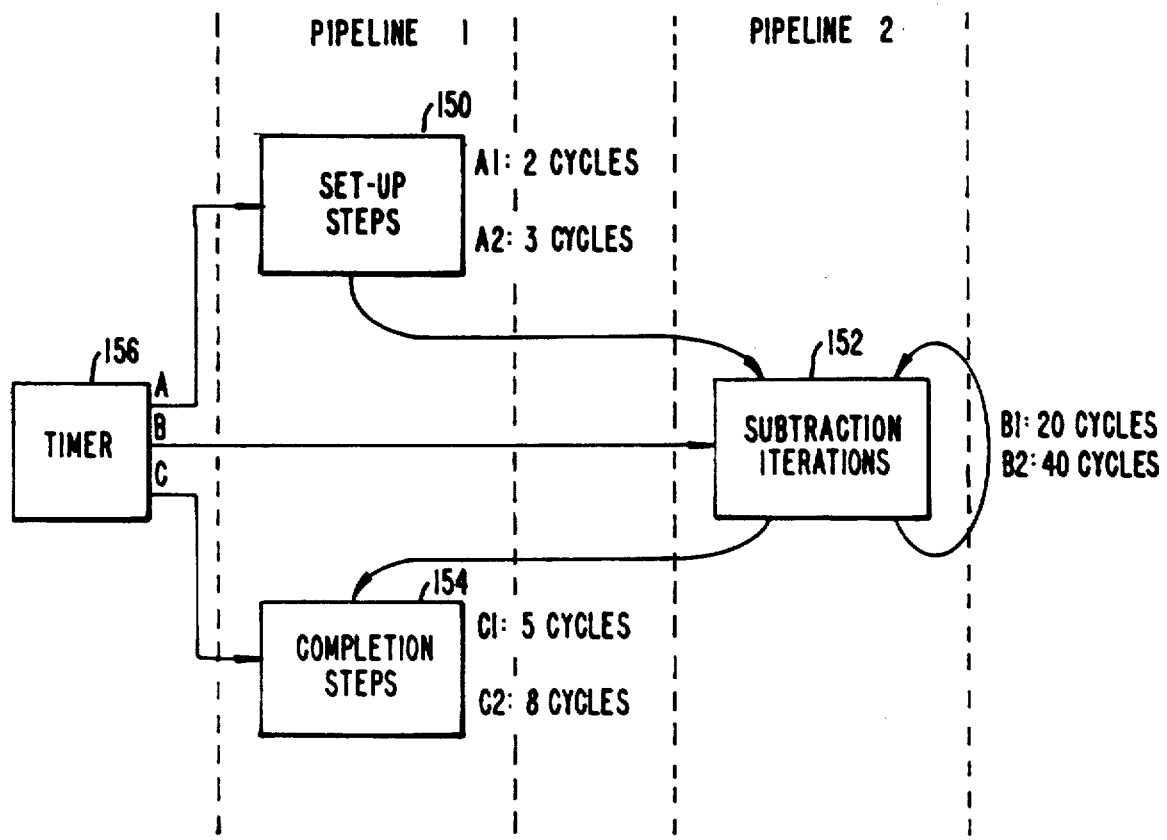
FIG._3.
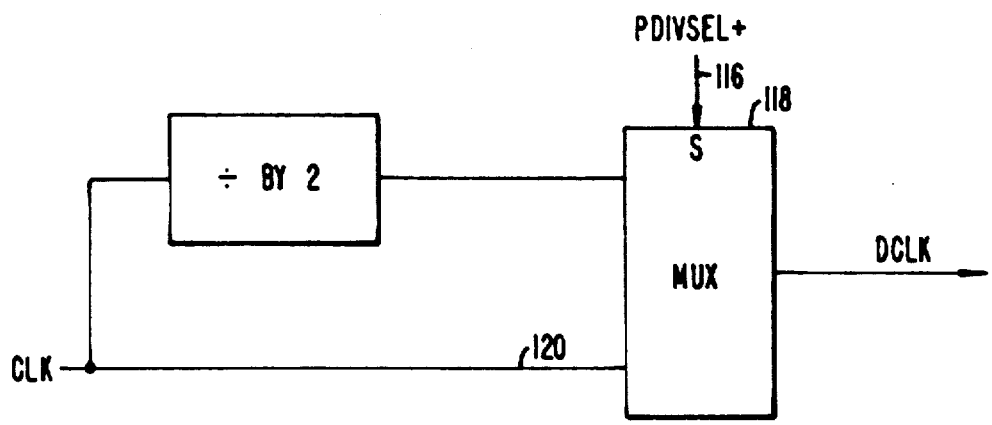
FIG._9.

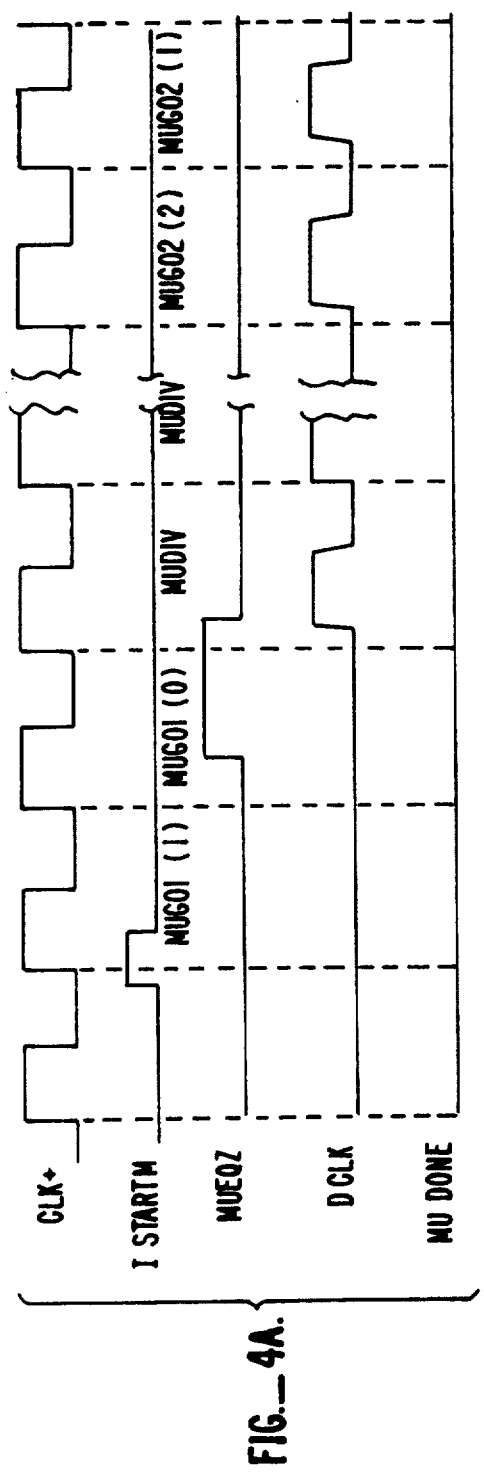
FIG._4A.
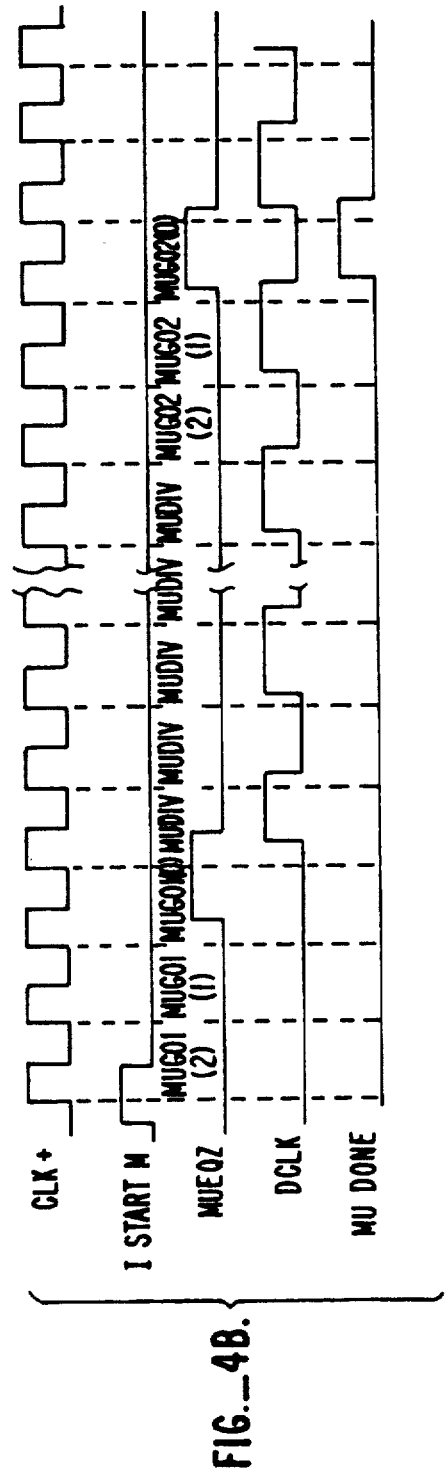
FIG._4B.

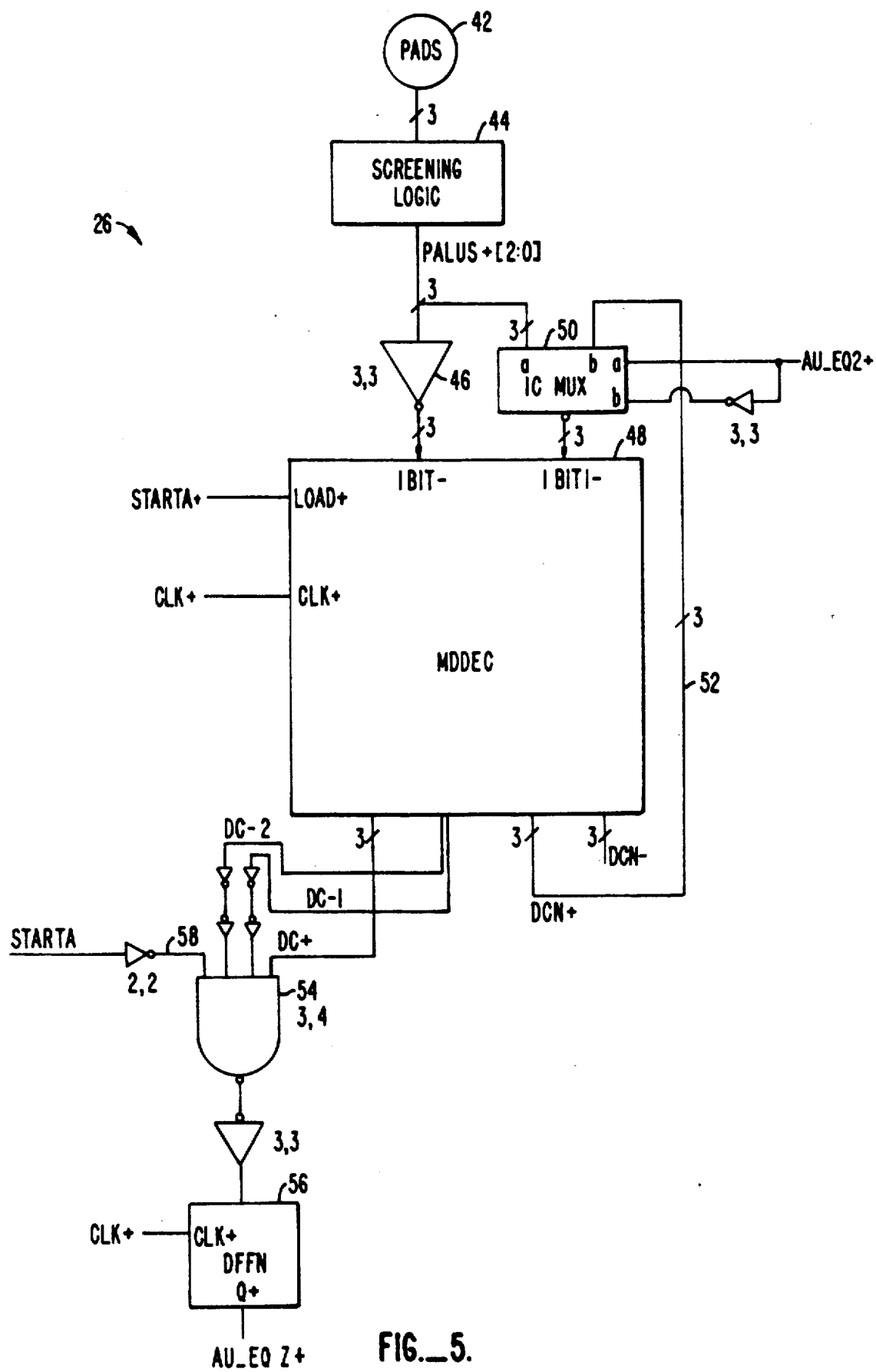
FIG._5.

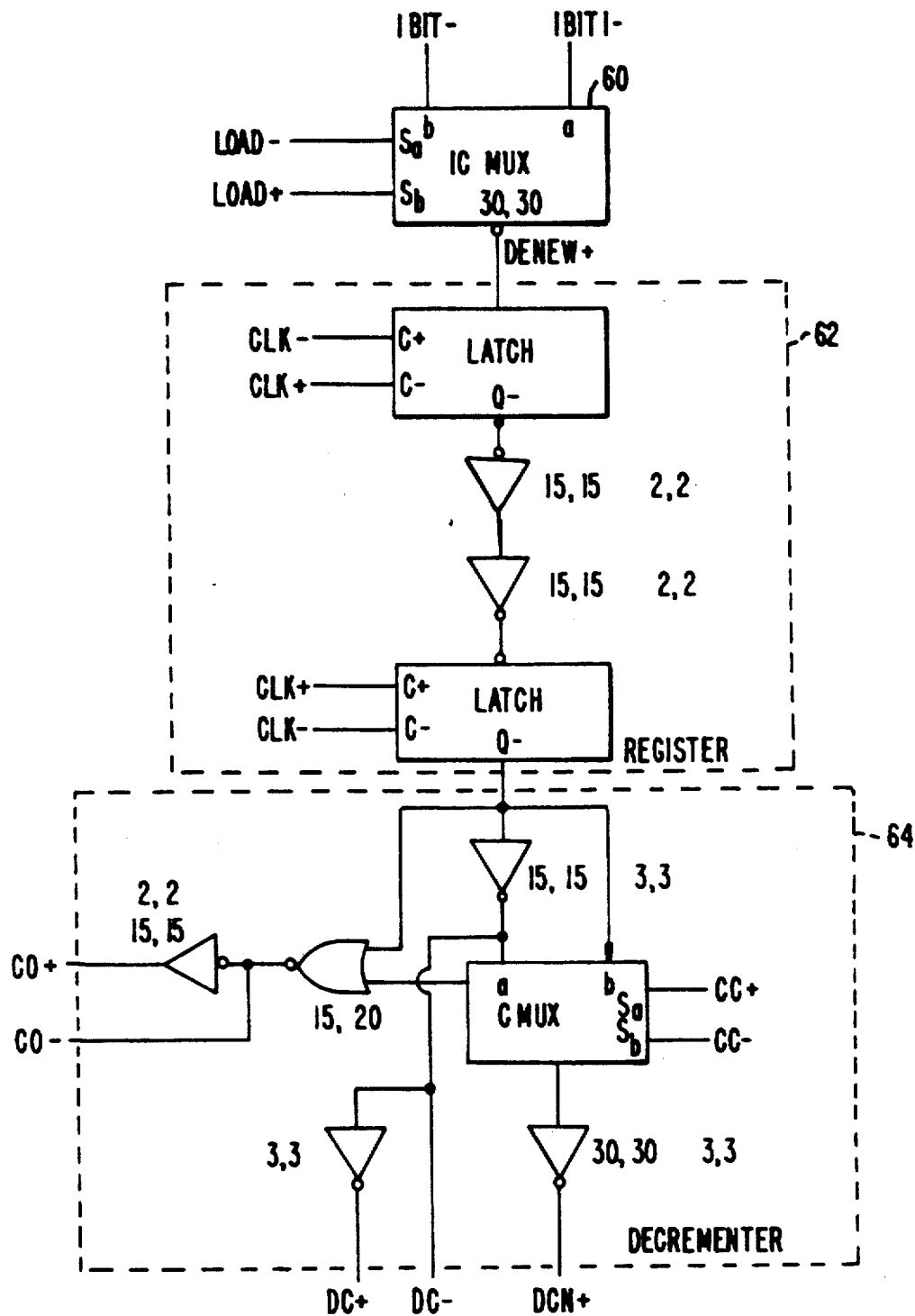
FIG._6.

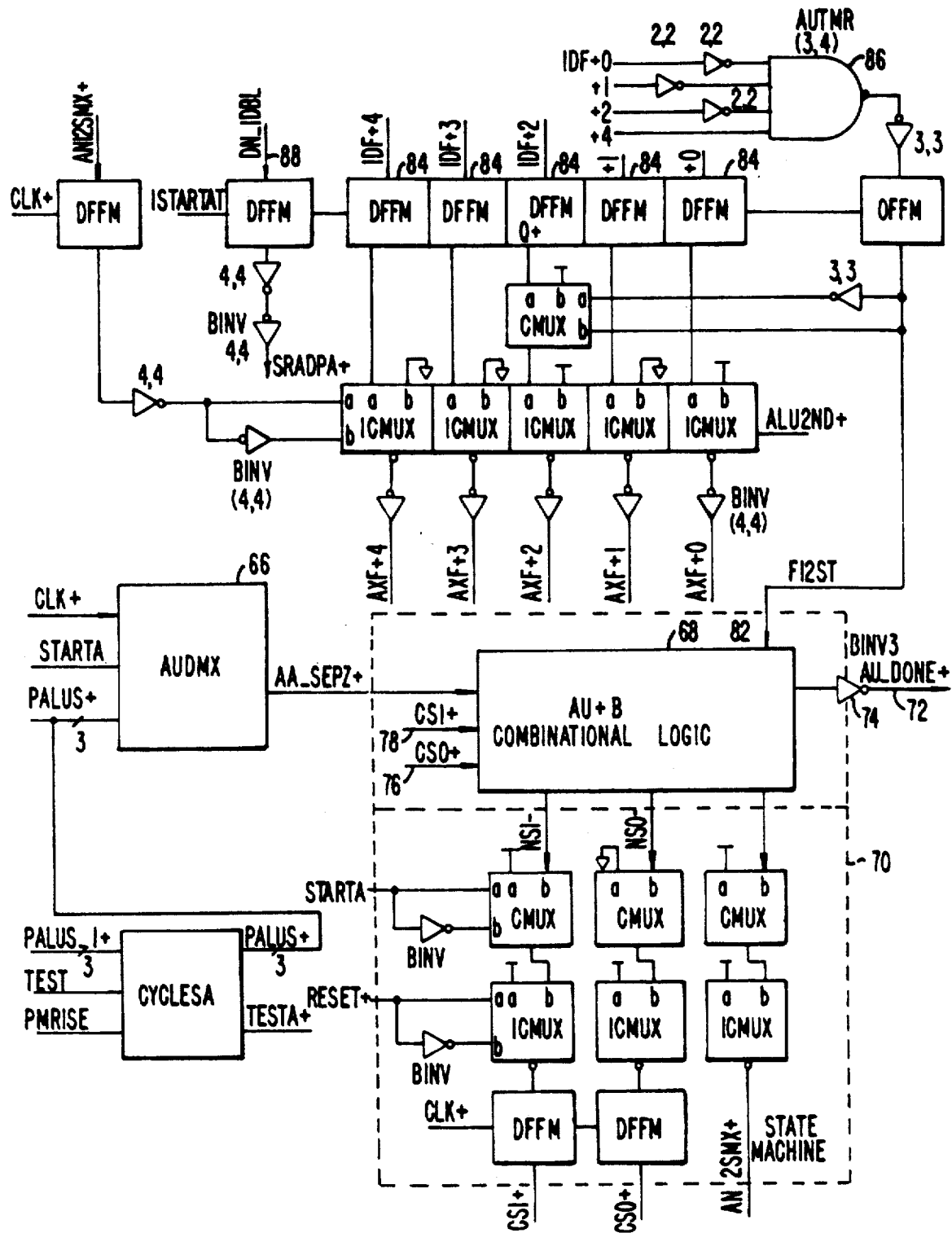
FIG._7.

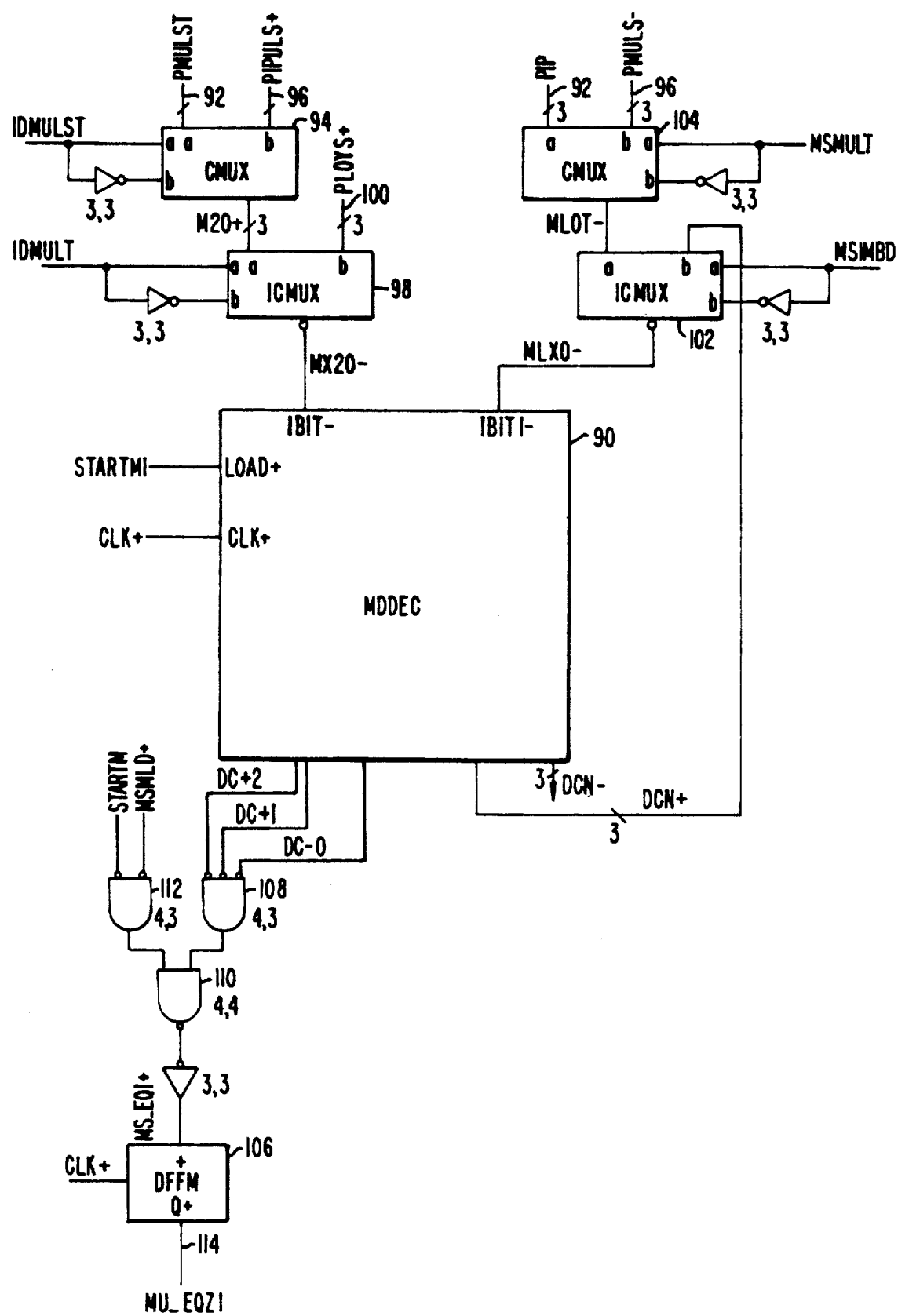
FIG._8.

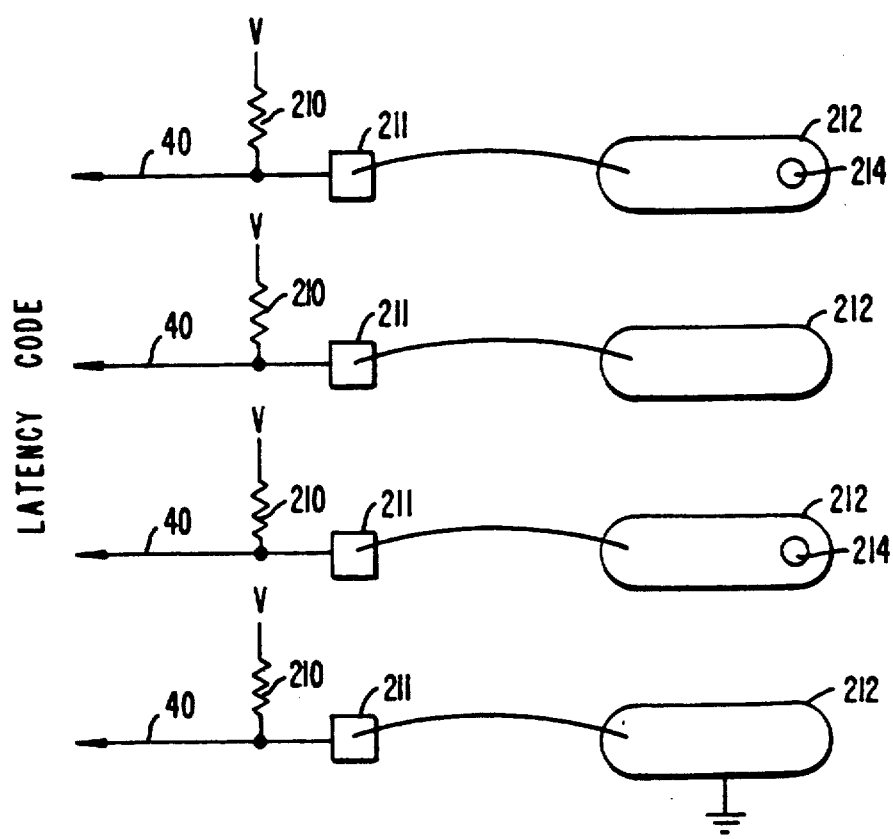
FIG._10.

VARIABLE LATENCY METHOD AND APPARATUS FOR FLOATING-POINT COPROCESSOR

BACKGROUND

The present invention relates to integrated circuits which perform arithmetic operations and are controlled by a system clock.

Coprocessors and/or floating point units can perform a variety of arithmetical functions. Certain functions, such as addition, subtraction and logical operations could be implemented completely combinatorially. Other operations, such as double precision multiplication, division, and square root might often be implemented as a collection of combinatorial blocks separated by registers and/or latches. In general, all arithmetic functions could be implemented as one or more combinatorial circuit blocks (sometimes also called "sections" or "pipes"), each separated from other combinatorial blocks by storage elements (latches or registers). Each may be used zero, one or more times during a particular operation. Blocks could also be shared by several functions. For example, a large combinatorial circuit could often be shared among division, square root, and multiplication algorithms.

A completely combinatorial implementation of an algorithm (addition, for example), is the simplest of the above implementations: it has only one combinatorial block and no storage elements.

Each combinatorial block requires no less than a certain amount of time to generate a correct result after its operands appear in (are clocked into) its input storage elements. The control signal that clocks new operands into the block's input registers is often called a start signal for this block. The time allocation for each pipe (in order for it to produce a correct result) is implemented via a timer that counts a certain number of system clock cycles after the corresponding start signal. Each section could require one or more system clock cycles, depending on the system cycle time. In general, for a particular pipe with a particular set of inputs, the number of system cycles allowed for operation completion, multiplied by the cycle time, has to be greater than or equal to the minimum amount of time required for the correct result to be computed by the pipe.

Currently (in the present art), the number of cycles allowed for each pipe is hard-wired into the integrated circuit implementation. The number of cycles for a pipe cannot be changed via hardware means outside of the integrated circuit.

If the hard-wired number of cycles allowed for a certain pipe is too small, this particular pipe will become the limiting factor in determining the coprocessor's fastest cycle time. On the other hand, if the number of cycles for the same pipe is too big, the system will not be able to take full advantage of the pipe's speed.

SUMMARY OF THE INVENTION

The present invention provides a programmable latency (a programmable number of clock cycles) needed for an operation completion. The required latency for a pipe is determined from a formula including the system clock cycle time which the unit will be specified to operate under. The latency is pre-programmed by setting the count of a timer accordingly to provide at least the minimum number of clock cycles necessary to cover the time required to do the computation. Separate timers are independently set for arithmetic logic unit (ALU) operations, multiply operations, logical operations and divide and square root operations.

For example, in division a number of iterations are required, with each iteration requiring one or more clock cycles. The number of cycles per divide iteration can be programmed to be 1 cycle for one clock speed and 2 cycles for another clock speed. This allows the division circuitry to be used for different clock speed versions of the coprocessor. The divide iteration latency is programmed differently for each version, for example a 20MHz coprocessor has latency programmed to one clock cycle per iteration, and a 33MHz coprocessor has latency programmed to two cycles per iteration. This way, the same chip can be used for both 33MHz and 20MHz systems, with the divide performance being approximately the same for each.

In one preferred embodiment, a coprocessor chip is programmed when packaged using input bonding pads, signals on which are decoded to provide counts for the timers. These inputs can be programmed during assembly by connecting them to pins or bonding fingers inside the package and providing a voltage to the pins or the bonding fingers. Internal (built into silicon) pull-up or pull-down resistors connected to these inputs can provide an appropriate voltage level when no other voltage source is connected to the pins or bonding fingers.

The present invention allows the independent setting of the number of clock cycles required in each of several pipelines, for each iteration of multiple iteration operations, and for purely combinational operations. The present invention allows a single coprocessor chip to be configured to operate at different clock speeds while maximizing (or adjusting to some desired performance level) the operation speed independently for each of the different types of operations. The invention also allows the same arithmetic units to be used in successive generations of coprocessor chips where the operation of the control logic is speeded up, but the arithmetic circuitry maximum speed remains unchanged. This is advantageous because it usually takes longer to redesign arithmetic circuitry. Finally, the invention allows a majority of test patterns to be run at one latency for different latency versions of the chip.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a diagram of a processor-coprocessor system;

FIG. 2 is a block diagram of a portion of a coprocessor using the programmable latency of the present invention;

FIG. 3 is a diagram showing the different clock cycle requirements for different portions of a divide operation;

FIGS. 4A and 4B are timing diagrams for divide operations with different clock speeds;

FIG. 5 is a block diagram of the timer circuit of FIG. 2;

FIG. 6 is a circuit diagram of a portion of the timer logic of FIG. 5;

FIG. 7 is a more detailed block diagram of portions of the control logic of FIG. 2 for an arithmetic logic unit (ALU);

FIG. 8 is a diagram of an equivalent circuit of FIG. 5 for a multiplier unit;

FIG. 9 is a diagram of the divide clock select circuit; and

FIG. 10 is a diagram of the use of bonding pads for programming the latency code.

DETAILED DESCRIPTION OF THE PREFERRED EMBODIMENTS

FIG. 1 shows a typical system with a microprocessor 130 and a coprocessor 132. The coprocessor includes bus control circuitry 134, arithmetic control circuitry 136 and arithmetic logic 138. An instruction (operation code) indicating the type of operation to be performed is provided on a bus 140. The data which will be used in the operation are provided on a bus 142.

Bus control circuit 134 receives an instruction, and after using a few cycles to decode it, provides the start signal on line 144. A start signal on a line 144 initiates an arithmetic operation in arithmetic logic 138 and also starts a sequence in arithmetic control 136. The completion of the operation is indicated by a DONE signal on a line 146 from arithmetic control logic 136 to bus controller 134. This DONE signal can be generated entirely within arithmetic control logic 136 by use of an internal timer, or by the combination of a signal from arithmetic logic 138 on a line 148 and control logic 136.

It should be noted that bus control circuit 134 and/or arithmetic control circuit 136 could be in a separate chip outside the coprocessor chip, making the START and DONE signals external signals rather than internal signals. In addition, the coprocessor circuitry could be combined on the same chip as the microprocessor. The present invention is independent of the particular configuration used.

FIG. 2 shows a portion of a coprocessor 10 having an arithmetic unit 12. The arithmetic unit can either be the multiplier circuit, a logic unit, or an arithmetic logic unit. Arithmetic unit 12 receives an operation code on lines 14 and operands on line 16. The result is provided on output lines 18.

A clock signal on a line 20 and a start signal on a line 22 are also provided. A DONE signal on a line 24 signals when the result on lines 18 is ready.

The clock and start signals are provided to timer 26 which counts down on each clock cycle (the timer could also count up or through an arbitrary sequence). Timer 26 will reach 0 in more than the amount of time required for the operation to be done in arithmetic unit 12. The completion signal is supplied through a state machine 30 to output line 24. State machine 30 provides control inputs on lines 34 to arithmetic unit 12 for setting up and controlling the operation to be performed.

A latency code is provided on input lines 40 to timer 26. This code controls the number of clock cycles required before a DONE signal will appear on line 24. For example, if arithmetic unit 12 needs 150 nanoseconds (ns) to complete an operation, and the external clock has a 50 nanosecond cycle time, the latency code will be set to 3 so that a DONE signal will appear after three clock cycles, which equal 150 ns. If, on the other hand, the master clock cycle is 30 ns, a setting of 3 would end up in the DONE signal being present after 90 ns, before the result is ready. Accordingly, for a chip to be used with such a master clock, the latency code is set to 5 so that the DONE signal does not appear until 5 × 30 ns = 150 ns.

Tables 1-4 below set forth one embodiment of the programmable latency, in terms of clock cycles, for different latency codes for the different operations. A separate latency code is provided for each arithmetic unit, with one code for the ALU operation, a separate code for the multiplier (MUL) operations, a third code for the logical operations and a fourth code which controls the number of cycles for each divide iteration. The inputs are provided by lines 40, indicating the latency code.

In one embodiment as shown in FIG. 10, lines 40 can be internally connected to the positive voltage via pull-up resistors 210 connected to bonding pads 211, The code is then provided by the high voltage on the pull-up lines or by connecting desired ones of lines 40 to bonding fingers 212 inside the package, which in turn can be connected to ground. Alternately, a pull-down transistor to ground could be used and the lines desired to be programmed differently could be connected to a bonding finger connected to the positive voltage supply. Finally, the lines can be directly connected to input pins 214 so that they can be externally programmed. There could also be some decoding logic between the pins and the lines. Decoding is a mapping between a set of possible values on the pins and the corresponding set of values on the lines that are used for timer setting.

One advantage of connecting the lines to external pins is as follows. Suppose some arithmetic pipe take 80ns to complete. Suppose the bus controller works in the range of frequencies from higher than 40MHz to 33MHz. In order to take full advantage of the pipe speed we could allow 4 cycles for its completion for a 40 MHz part (25ns cycle) and 3 cycles for a 33MHz part (30ns cycle). If the bus controller did not meet 40MHz we could slow it down to a 33MHz grade without slowing down arithmetic performance (we would change the latency to 3 cycles at the same time). This could not have been done with an already packaged part if the lines were not connected to external pins.

If the latency programming is controllable by the pins, it is possible to have majority of patterns for testing different parts at one latency. (At least for functional testing of the part). Only a small set of patterns for timer testing has to be at a different latency. This applies especially when we want to make the part slower, for instance for compatibility with a certain performance level. We then can test the part at a faster latency for most of the test. This part of the test would be identical with the faster product. Then a small test pattern could be added for testing slower timer settings. This is important since it takes a long time to develop test vectors (especially bus controller test vectors).

TABLE 1

| ALU Operations | |
|---|---|
| Latency Code (PALUS+) | ALU latency (cycles) |
| 001 | 2 |
| 010 | 3 |
| 011 | 4 |
| 100 | 5 |
| 101 | 6 |
| 110 | 7 |

TABLE 2

| | MUL Operations | |
|---|---|---|
| Latency Code (PMULS+) | Single Precision MULS Latency (cycles) | Double Precision MULD Latency (cycles) |
| 001 | 2 | 2 |
| 010 | 3 | 4 |
| 011 | 4 | 6 |
| 100 | 5 | 8 |
| 101 | 6 | 10 |
| 110 | 7 | 12 |

TABLE 3

| | Logical Operations |
|---|---|
| Latency Code (PLOGS+) | Logical Latency (cycles) |
| 01 | 2 |
| 10 | 3 |
| 11 | 4 |

TABLE 4

| | Divide Iterations |
|---|---|
| Latency Code (PDIVSEL+) | Cycles per divide iteration |
| 0 | 1 |
| 1 | 2 |

FIG. 3 diagrams the various latencies which may be involved in arithmetic operation, in particular a divide operation. A divide operation requires three phases which may occur in different pipelines on a chip. In a first phase, a number of setup steps 150 perform an initial computation. Subsequently, there are a series of subtraction iterations 152. Finally, there are a number of completion steps 154. The timing for each of the phases is provided by a timer 156.

For a first clock speed, setup steps 150 might require 2 cycles, subtraction iterations 152 might require 20 cycles, and completion steps 154 could require 5 cycles. For a second, faster clock speed, 3 cycles may be needed for setup means 150 to provide the same fixed period of time. At the faster clock speed, one clock cycle may not be enough for a divide iteration. Thus two clock cycles per divide iteration may be required. Finally, completion steps 154 might require an increase of a different number of cycles from that of setup steps 150. Thus, for optimal reconfigurability, separate programmable latencies are provided for each of the 3 phases.

FIGS. 4A and 4B provide examples of the timing for a divide operation such as shown in FIG. 3 for two different clock speeds. FIG. 4B shows a clock signal (CLK+) having a faster frequency than the clock of FIG. 4A. In FIG. 4A, the operation is commenced with a pulse on the line ISTARTM. This is followed by two clock cycles for the first phase, indicated as cycles MUG01(1) and MUG01(0). The completion of this phase is indicated by a pulse on a signal line MUEQZ. This is followed by a number of divide iteration cycles indicated MUDIV which are each clocked with a separate divide iteration clock DCLK. Upon completion of the iterations of phase 2, three clock cycles are used for phase 3, MUG02(2)MUG02-(0). The end of phase 3 is indicated by another pulse on line MUEQZ. This also causes the generation of a DONE signal, MUDONE.

In FIG. 4B, with the faster clock cycle, it can be seen that 3 cycles are now required for the first phase, indicated MUG01(2)-MUG01(0). Depending upon the clock cycle time, the number of cycles per divide iteration could still be one or could be changed to 2 cycles for divide iteration. As shown in FIG. 4B, it is changed to two cycles per divide iteration. The number of cycles for the third phase, MUG02, is shown as not changing in FIG. 4B. However, the number of cycles required could change, and could change by an amount different from the one extra cycle used for the first phase.

FIG. 5 shows the details of a timer 26 of FIG. 2 for an arithmetic unit which is an arithmetic logic unit (ALU). The latency code is provided from pins or bonding fingers via bonding pads 42 through screening logic 44, which prevents a zero condition from being presented, through an inverter 46 to decrementer 48. Each of the three bits provided from inverter 46 is routed through decrementer 48. FIG. 6 shows the logic for one of the three bits in decrementer 48. Each output is fed back through a multiplexer 50 on lines 52.

When the count of decrementer 48 reaches 001, a NAND gate 54 provides an output which is then latched on the following clock cycle in a register 56. The following clock cycle will be the zero count of the decrementer, which is anticipated by NAND gate 54. NAND gate 54 provides a signal to register 56, which in turn provides a select signal to multiplexer 50. Multiplexer 50 provides the output of decrementer 48 back to its input so that another count can be cycled through for another iteration. The output provided back to the input is dcn+, which counts down toward zero on each cycle. Dcn− is the opposite polarity (one's compliment) of dcn+. The initial counter value for the first (and subsequent passes) of an operation comes from the other input of MUX 50. The dc+ and dc− signals provide the count before the current dcn+ and dcn− counts. These are used by NAND gate 54 to anticipate the end of the count. The start signal on line 58 prevents NAND gate 54 from loading register 56 to signal a false completion of an operation when the decrementer 48 is being started. This is necessary because the decrementer is constantly cycling.

FIG. 6 shows a multiplexer 60, a register 62 and a decrementer 64 for one bit slice of decrementer 48 of FIG. 5. Carry bits Co+ and Co− are provided to next bit slice stage. The inputs and outputs are connected as shown in FIG. 5.

FIG. 7 shows more details of the state machine circuit 30 of FIG. 2 for the ALU. Decrementer circuitry 66 is as shown in FIG. 5. This is connected to combinational logic 68 which is a part of a state machine 70. A DONE signal is provided on line 72 from an inverter 74 coupled to combinational logic 68 in a state machine 70. Feedbacks are provided on lines 76 and 78 from the registers of state machine 70 to combinational logic 68. Finally, an input is provided on a line 82 to combinational logic 68. This signal is decoded from the operational code to indicate an integer-to-single precision conversion operation that requires two passes through the ALU logic.

The operation code is provided to flip-flops 84 and the inputs to NAND gate 86. An input on a line 88 indicates whether a double precision operation is being executed.

The decoding of the operation code and the details and functioning of the state machine would be obvious to one of skill in the art.

FIG. 8 shows a decrementer (timer) 90 which would be used for a multiply unit, which receives single precision multiply latency codes on inputs 92 to a multiplexer 94. A double precision latency code is provided on separate latency inputs 96 to multiplexer 94. A selected one of these inputs is provided to a second multiplexer 98, which chooses between the multiply latency code and a logic latency code on lines 100 for a logic operation which also uses the multiplier unit.

Subsequent passes through decrementer 90 are routed back through a multiplexer 102 in a similar manner to that shown in FIG. 5. Here, however, two separate inputs 92 and 96 are provided through another multiplexer 104 for the last stage of either a divide operation or a double precision multiply operation.

Again, similar to FIG. 5, an output register 106 is clocked when a value of 001 appears on a preceding signal at the inputs of a NAND gate 108. This is provided through a separate NAND gate 110, which receives its other input from a NAND gate 112. NAND gate 112 has as its inputs a start signal and a "Multiplier State Machine Load" signal. The load signal is activated for compound operations when the decrementer is reloaded in the middle of an operation (i.e., a double precision multiply or divide). The output signal on line 114 is provided to combinational logic for the multiplier unit in a similar manner to that shown in FIG. 7 for the arithmetic logic unit.

For the divide iterations (FIG. 9), an input pin 116 selects, through a multiplexer 118, either the clock frequency on line 120 or one-half the clock frequency at the output of a divide by 2 circuit 122. The resulting clock signal, DCLK, is provided to the divide circuit to control the divide iterations.

As will be understood by those familiar with the art, the present invention may be embodied in other specific forms without departing from the spirit or essential characteristics thereof. For example, the same code could be used to control any number of pipes or sections, such as both an ALU block and a block that is used for single precision multiplication. Accordingly, the disclosure of the preferred embodiment of the invention is intended to be illustrative, but not limiting, of the scope of the invention which is set forth in the following claims.

What is claimed is:

1. An apparatus for performing arithmetic operations on supplied operands and using a clock, comprising:
   arithmetic logic means for performing an arithmetic operation on said operands upon receipt of a provided start signal;
   counter means for producing a done signal a predetermined number of cycles of said clock after said start signal; and
   programmable means, coupled to an input of said counter means, for varying said number of cycles of said clock required to produce said done signal, such that a latency between said start and done signals can be controlled.

2. The apparatus of claim 1 further comprising:
   a second arithmetic logic means, including a multiplier, for performing multiply operations on said operands upon receipt of a provided multiplier start signal;
   second counter means for producing a multiply done signal a predetermined number of cycles of said clock after said multiplier start signal; and
   second programmable means, coupled to an input of said second counter means, for varying said number of cycles of said clock required to produce said multiply done signal, such that a latency between said multiplier start signal and said multiply done signals can be minimized for varying cycle times of said clock.

3. An apparatus for performing arithmetic operations on supplied operands and using a clock, comprising:
   arithmetic logic means for performing an arithmetic operation on said operands upon receipt of a provided start signal;
   counter means for producing a done signal a predetermined number of cycles of said clock after said start signal;
   programmable means, coupled to an input of said counter means, for varying said number of cycles of said clock required to produce said done signal, such that a latency between said start and done signals can be controlled;
   means for selecting a variable number of clock cycles for divide iterations; and
   means coupled to said means for selecting, for providing a divide clock to said arithmetic logic means.

4. An apparatus for performing arithmetic operations on supplied operands and using a clock, comprising:
   arithmetic logic means for performing an arithmetic operation on said operands upon receipt of a provided start signal;
   programmable means for varying a number of cycles of said clock required to produce a done signal, such that a latency between said start and done signal can be varied;
   a counter coupled to said programmable means for starting at a count set by said programmable means;
   logic means, coupled to an output of said counter, for producing a completion signal when said counter output is equal to a predetermined value; and
   a storage element coupled to an output of said logic means for producing said done signal at its output upon a next clock cycle after said logic means receives said predetermined value.

5. The apparatus of claim 4 wherein said counter means further comprises second logic means, coupled between said programmable means and said counter, for decoding an output of said programmable means and for preventing a zero value being presented to said counter.

6. The apparatus of claim 4 wherein said logic means includes means for inhibiting said completion signal while said start signal is received.

7. An apparatus for performing arithmetic operations on supplied operands and using a clock, comprising:
   arithmetic logic means for performing an arithmetic operation on said operands upon receipt of a provided start signal;
   counter means for producing a done signal a predetermined number of cycles of said clock after said start signal; and
   input bonding pads of a chip containing said apparatus coupled to an input of said counter means, for varying said number of cycles of said clock required to produce said done signal, such that a latency between said start and done signals can be controlled.

8. The apparatus of claim 7 wherein some of said input bonding pads are coupled to a voltage reference through a resistor on said chip.

9. The apparatus of claim 7 wherein some of said input bonding pads are coupled to a voltage reference via bonding wires connected to package bonding fingers.

10. The apparatus of claim 7 wherein some of said input bonding pads are coupled to an input pin.

11. A coprocessor for performing arithmetic operations on supplied operands and using a clock, comprising:
- first arithmetic logic means for performing an arithmetic operation on said operands upon receipt of a provided arithmetic start signal;
- first counter means for producing an arithmetic done signal a predetermined number of cycles of said clock after said arithmetic start signal;
- first programmable means, coupled to an input of said first counter means, for varying said number of cycles of said clock required to produce said arithmetic done signal, such that a latency between said arithmetic start and arithmetic done signals can be controlled;
- a second arithmetic logic means, including a multiplier, for performing multiply operations on said operands upon receipt of a provided multiplier start signal;
- second counter means for producing a multiply done signal a predetermined number of cycles of said clock after said multiplier start signal;
- second programmable means, coupled to an input of said second counter means, for varying said number of cycles of said clock required to produce said multiply done signal, such that a latency between said multiplier start signal and said multiply done signals can be controlled;
- third programmable means for selecting a variable number of cycles for divide iterations; and
- means, coupled to said third programmable means, for providing a divide clock to one of said arithmetic logic means.

12. A coprocessor for performing arithmetic operations on supplied operands and using a clock, comprising:
- first arithmetic logic means for performing an arithmetic operation on said operands upon receipt of a provided arithmetic start signal;
- first counting means for producing an arithmetic done signal a predetermined number of cycles of said clock after said arithmetic start signal, said first counting means including
  - a first counter having an input for receiving a first starting count,
  - first logic means, coupled to an output of said first counter, for producing a completion signal when said first counter output is equal to a first predetermined value, and
  - a first register coupled to an output of said first logic means for producing said arithmetic done signal at its output upon a next clock cycle after said first logic means receives said first predetermined value;
- first programmable means, coupled to said input of said first counting means, for providing said first starting count to control said number of cycles of said clock required to produce said arithmetic done signal, such that a latency between said arithmetic start and arithmetic done signals can be controlled based on the cycle time of said clock;
- a second arithmetic logic means, including a multiplier, for performing multiply operations on said operands upon receipt of a provided multiplier start signal;
- second counting means for producing a multiply done signal a predetermined number of cycles of said clock after said multiplier start signal, said second counting means including
  - a second counter having an input for receiving a second starting count,
  - second logic means, coupled to an output of said second counter, for producing a second completion signal when said second counter output is equal to a second predetermined value, and
  - a second register coupled to an output of said second logic means for producing said multiply done signal at its output upon a next clock cycle after said second logic means receives said second predetermined value;
- second programmable means, coupled to said input of said second counter, for providing said second starting count to control said number of cycles of said clock required to produce said multiply done signal, such that a latency between said multiplier start signal and said multiply done signals can be controlled;
- third programmable means for selecting a variable number of cycles for divide iterations; and
- means, coupled to said third programmable means, for providing a divide clock to one of said arithmetic logic means.

* * * * *